US009805548B2

(12) United States Patent
Patta

(10) Patent No.: US 9,805,548 B2
(45) Date of Patent: Oct. 31, 2017

(54) ELECTRONIC METHOD OF PROVIDING AN ADDITIONAL PLAYER REWARD AND A GAMING SYSTEM

(75) Inventor: Julius Patta, Henderson, NV (US)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 456 days.

(21) Appl. No.: 13/490,839

(22) Filed: Jun. 7, 2012

(65) Prior Publication Data

US 2013/0331164 A1 Dec. 12, 2013

(51) Int. Cl.
*A63F 13/00* (2014.01)
*G07F 17/32* (2006.01)

(52) U.S. Cl.
CPC ........ *G07F 17/3244* (2013.01); *G07F 17/326* (2013.01); *G07F 17/3262* (2013.01)

(58) Field of Classification Search
CPC ............. G07F 17/3255; G07F 17/3244; G07F 17/3267; G07F 17/3248
See application file for complete search history.

(56) References Cited

U.S. PATENT DOCUMENTS

2002/0002075 A1* 1/2002 Rowe ..................... G06Q 20/10 463/25
2002/0039921 A1* 4/2002 Rowe et al. .................... 463/25
2003/0004871 A1* 1/2003 Rowe .............................. 705/39
2003/0104858 A1* 6/2003 Colin .................... A63F 9/0415 463/22
2004/0053681 A1* 3/2004 Jordan .................... G07F 17/32 463/20
2005/0215316 A1* 9/2005 Rowe ...................... A63F 13/12 463/29
2006/0264257 A1* 11/2006 Jaffe ....................... G07F 17/32 463/20
2007/0117608 A1* 5/2007 Roper ..................... G07F 17/32 463/16
2008/0102935 A1* 5/2008 Finnimore .......... G07F 17/3248 463/25

* cited by examiner

*Primary Examiner* — Omkar Deodhar
*Assistant Examiner* — Eric M Thomas
(74) *Attorney, Agent, or Firm* — McAndrews, Held & Malloy, Ltd.

(57) ABSTRACT

An electronic method of providing an additional player reward, the method comprising determining that a gaming session has been initiated by a player in respect of a gaming device in response to an initial establishment of gaming credits at the gaming device in response to operation of a credit input mechanism associated with the gaming device and without receiving any information identifying the player; monitoring play of the gaming device in order to determine, independently of any awards made as outcomes of wagers of gaming credits placed by the player on play of the gaming device, whether one or more characteristics of play of the gaming device entitle the player to an additional award; and making any determined additional award to the player.

10 Claims, 7 Drawing Sheets

ELECTRONIC METHOD OF PROVIDING AN ADDITIONAL PLAYER REWARD AND A GAMING SYSTEM

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to an electronic method of providing an additional player reward and a gaming system.

Some gaming venues provide player loyalty systems. To participate in such a system, a player registers such that a player account can be established, obtains a player card and presents the player card to a player marketing module at a gaming machine so that the player can be identified and play of the gaming machine by the player can be associated with the player account. Points accumulate in the player account and can be redeemed for good and/or services.

BRIEF SUMMARY OF THE INVENTION

In a first aspect, the invention provides an electronic method of providing an additional player reward, the method comprising:

determining that a gaming session has been initiated by a player in respect of a gaming device in response to an initial establishment of gaming credits at the gaming device in response to operation of a credit input mechanism associated with the gaming device and without receiving any information identifying the player;

monitoring play of the gaming device in order to determine, independently of any awards made as outcomes of wagers of gaming credits placed by the player on play of the gaming device, whether one or more characteristics of play of the gaming device entitle the player to an additional award; and making any determined additional award to the player.

In an embodiment, the one or more characteristics of play of the game include one or more of a total amount wagered during the gaming session or a number of games played during the gaming session.

In an embodiment, monitoring play of the gaming device comprises updating a current total value associated with at least one of the characteristics in response to the player playing the gaming device.

In an embodiment, determining a value of the additional award based on the current total value.

In an embodiment, determining that the player has completed a gaming session before making an additional award.

In a second aspect, the invention provides a gaming system comprising:

a display for displaying game outcomes to a player of the gaming system;

a credit input mechanism operable by the player to establish gaming credits in the gaming system without inputting any information identifying the player;

a game play mechanism operable by the player to place wagers on play of one or more games;

a game controller arranged to conduct game play of the one or more games, responsive to the player placing wagers of gaming credits with the game play mechanism, to thereby determine whether to make any awards as outcomes of wagers of gaming credits placed by the player in respect of the one or more games; and a game play monitor arranged to determine that a gaming session has been initiated by a player in response to an initial establishment of gaming credits with the currency input mechanism, monitor game play to determine, independently of any awards made as outcomes of wagers of gaming credits placed by the player, whether one or more characteristics of play of the gaming device entitle the player to an additional award; and to make any determined additional award to the player.

In an embodiment, the one or more characteristics of play of the game include one or more of a total amount wagered during the gaming session or a number of games played during the gaming session.

In an embodiment, the game play monitor monitors game play by updating a current total value associated with at least one of the characteristics in response to the player playing the one or more games.

In an embodiment, the game play monitor determines a value of the additional award based on the current total value.

In an embodiment, the game play monitor is arranged to determine that the player has completed a gaming session before making an additional award.

In a third aspect, the invention provides computer program code which when executed implements the above method.

In a fourth aspect, the invention provides a tangible computer readable medium comprising the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
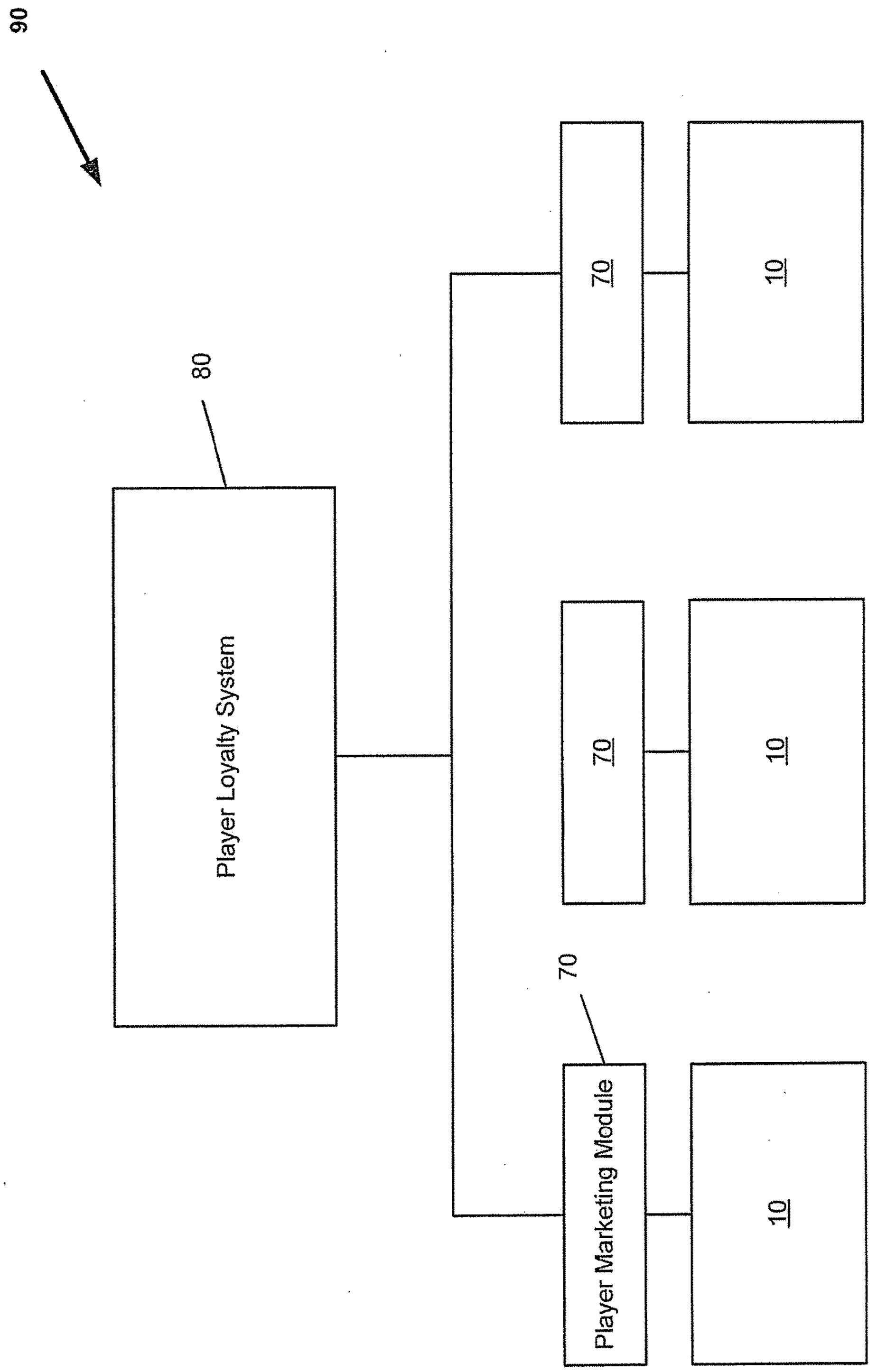
FIG. 1 is a block diagram of a gaming system.

Referring to the drawings, there is shown a gaming system arranged to make player awards to players of gaming devices without the need for players to participate in a loyalty system or otherwise be identified within the gaming system.

General Construction of Gaming System

Referring to FIG. 1, a plurality of gaming devices in form for gaming machines 10 are shown connected within a gaming system 90 to a player loyalty system 80 via player marketing modules 70. In some embodiments, as described in further detail below, additional functionality is built into the player marketing modules 70 in order to enable them to monitor play of gaming sessions on the gaming machines 10 without the player being identified within a gaming system.

A gaming device can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming device may operate in stand alone gaming machine mode, "thick client" mode or "thin client" mode depending on the game being played, operating conditions, and so on. Other variations will be apparent to persons skilled in the art.

Figure 8:
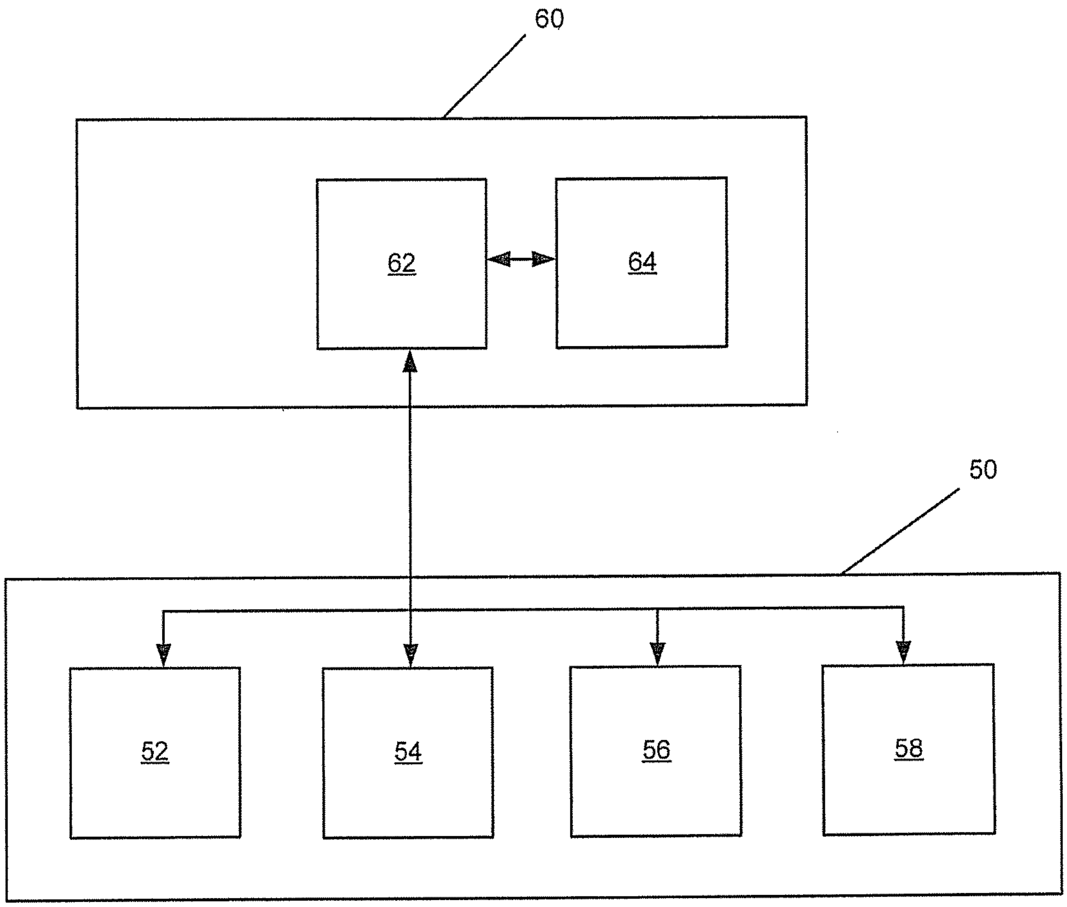
FIG. 8 is a block diagram of the core components of a gaming device.

Irrespective of the form, the gaming device has several core components. At the broadest level, the core components are a player interface 50 and a game controller 60 as illustrated in FIG. 8. The player interface is arranged to enable manual interaction between a player and the gaming device and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
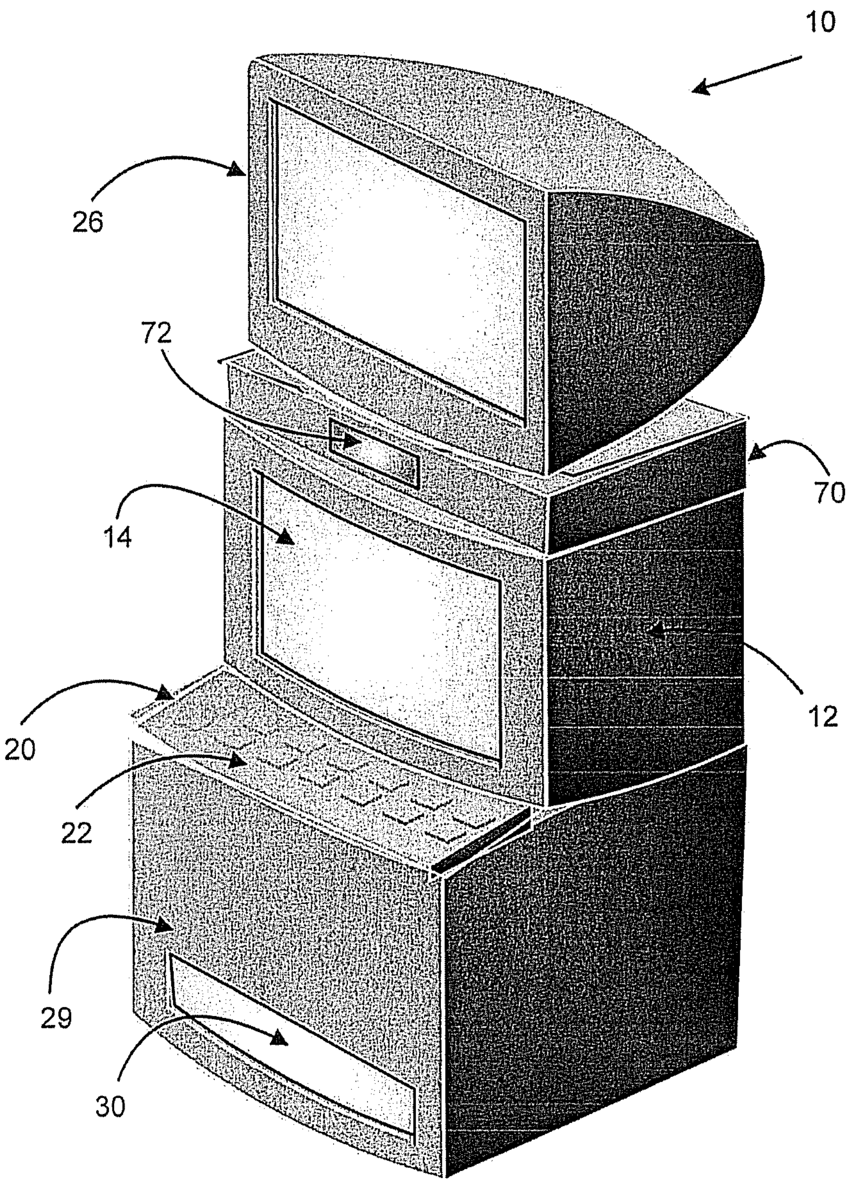
FIG. 2 is a perspective view of a stand alone gaming machine.

A gaming device in the form of a stand alone gaming machine 10 is illustrated in FIG. 2. The gaming machine 10 includes a console 12 having a display 14 on which are displayed representations of a game that can be played by a player. A mid-trim 20 of the gaming machine 10 houses a bank of buttons 22 for enabling a player to interact with the gaming machine, in particular during game play. The mid-trim 20 also houses a credit input mechanism, for example a coin input chute and a bill collector. Such currency input mechanisms will not identify the player. Other credit input mechanisms may also be employed, for example, an electronic funds transfer system for obtaining funds from a bank account by means of a debit card or credit card. Such electronic funds transfer systems may be configure so that they do not identify the player to the gaming machine. Other gaming machines may be configured for ticket in such that they have a ticket reader for reading tickets having a value and crediting the player based on the face value of the ticker. Again such tickets will not identify the player. A player marketing module 70 is mounted as a unit below the top box and has a reading device may for the purpose of reading a player tracking device, for example as part of a loyalty program and a touch screen display 72 for displaying information to the player and for receiving input. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module 70. It will be appreciated that while using the player marketing module will identify the player to the The top box 26 has a display. In other embodiments, the top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 display may be of the same type as the display 14, or of a different type.

Figure 3:
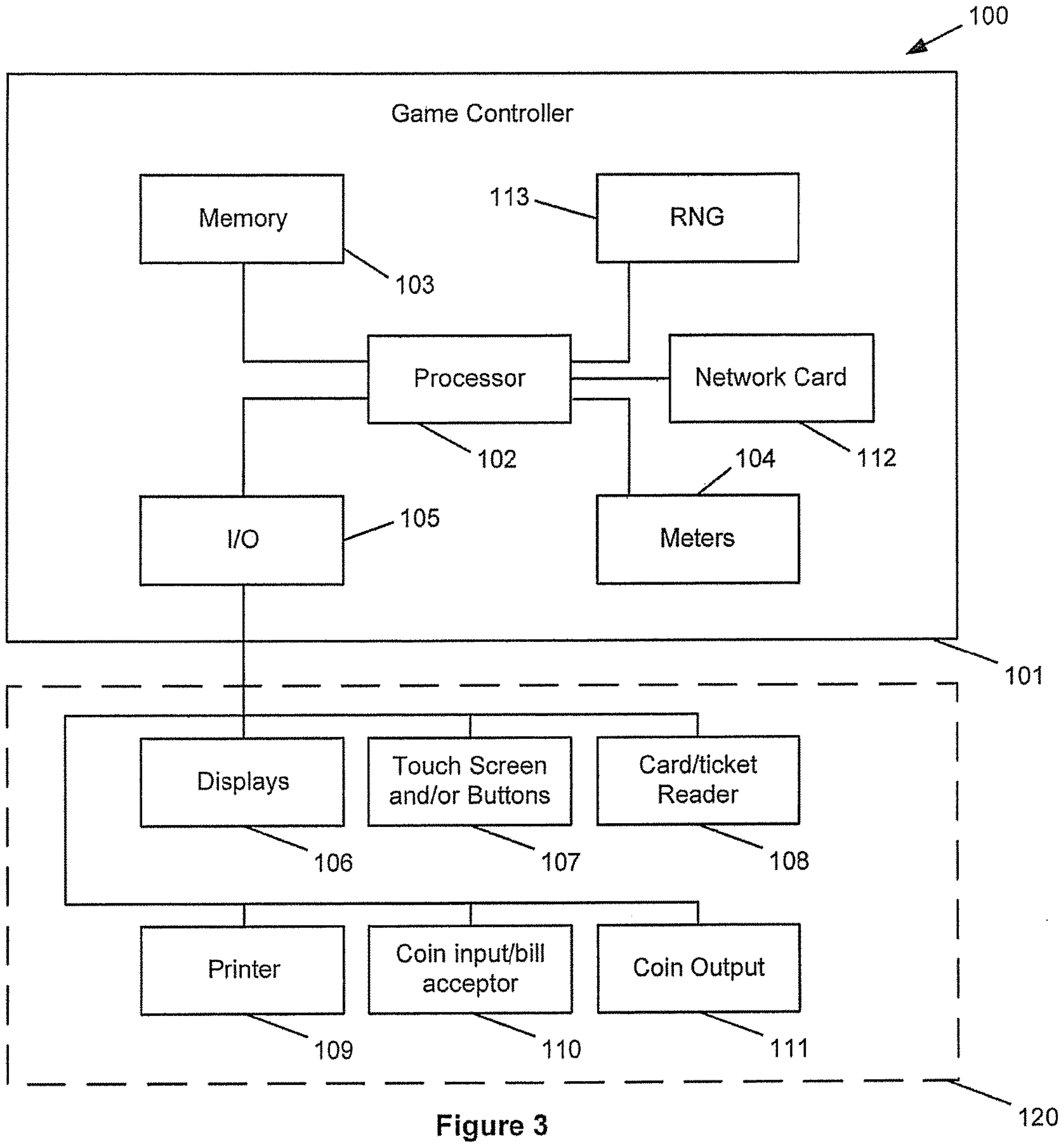
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, loyalty system, server or database. In embodiments employing a player marketing module as shown in FIGS. 1 and 2, communications over a network may be via player marketing module—i.e. the player marketing module may be in data communication with one or more of the above devices and communicate with it on behalf of the gaming machine.

Figure 4:
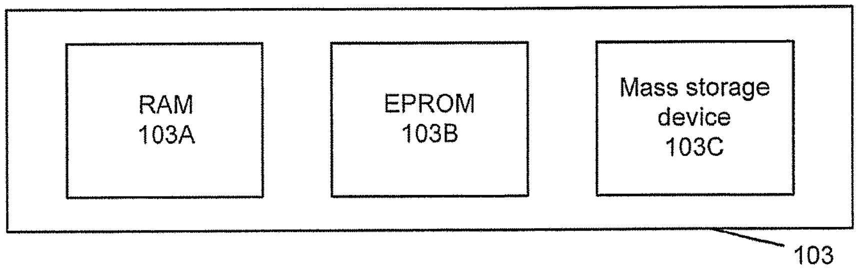
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
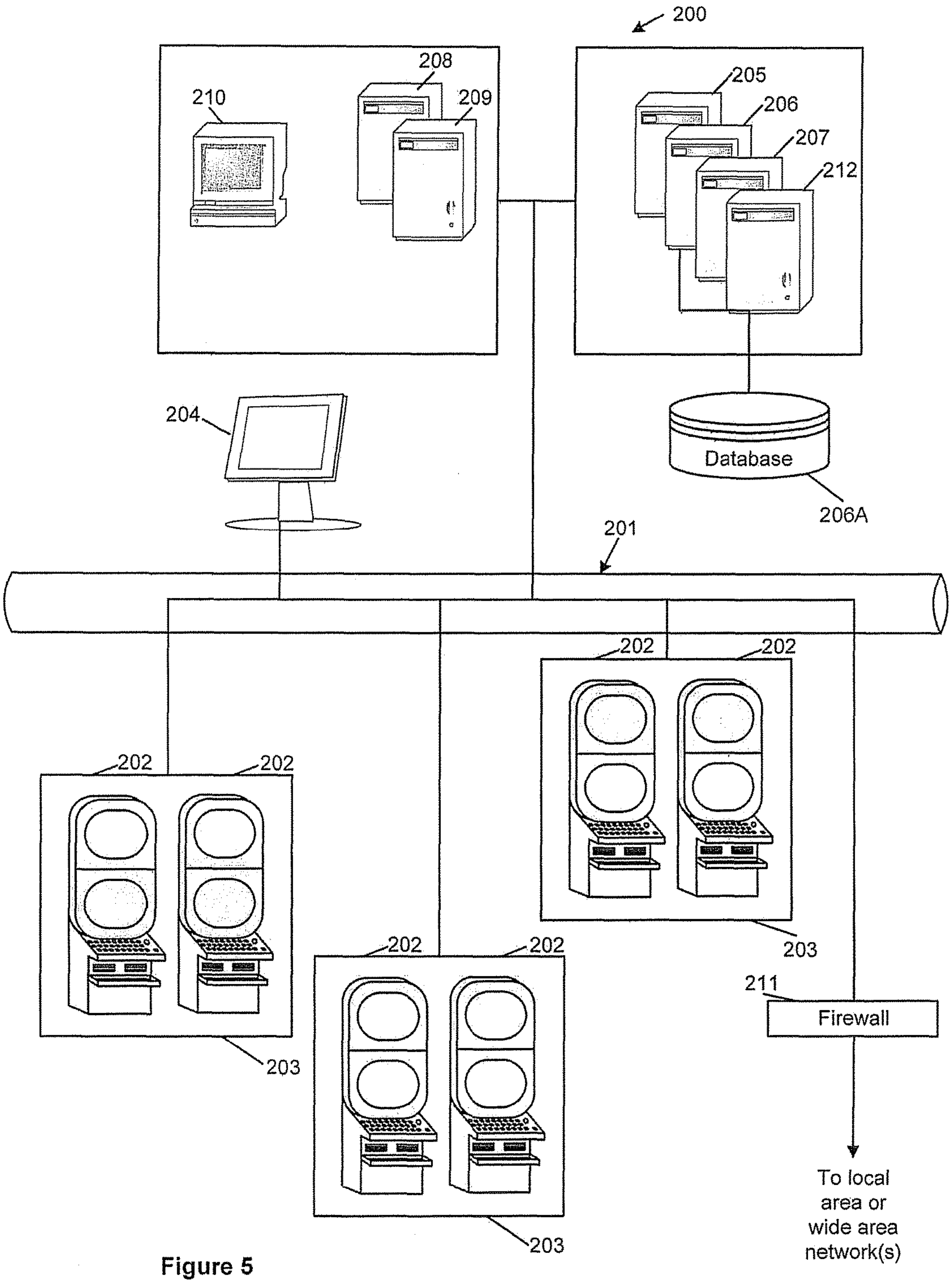
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. The player loyalty system 80 may be provided by one of these servers, for example on loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming Device

The player operates the game play mechanism 56 to specify a wager and hence the win entitlement which will be evaluated for this play of the game. The win entitlement can effect what outcomes can occur in the game or result from the wager so as to affect what awards may result from the player placing the wager. Typically placing the wager also initiates a play of the game. Persons skilled in the art will appreciate that a player's win entitlement will vary from game to game dependent on player selections and what features are provided. For example, some gaming devices may be linked to a jackpot controller and a portion of each wager is diverted to a jackpot pool which the player has a chance of winning as an additional outcome of placing the wager. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of pay lines and are an inherent part of the win entitlement.

Persons skilled in the art, will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 ways to win.

In other embodiments a player win entitlement may be affected by purchasing access to particular pay tables—e.g. a first bet amount entitles the player to wins including cherries and a second amount entitles them to wins including plums.

The game controller 60 generates a game outcome based on the wager. For example, by selecting symbols for display on display 54. One example of selecting symbols is to select symbols for display from a plurality of symbol sets corresponding to respective ones of a plurality of spinning reels. The symbol sets can specify a sequence of symbols for each reel such that the symbol the game controller can select all of the symbols by selecting a stopping position in the sequence. In one example, three symbols of each of five reels may be displayed such that symbols are displayed at fifteen display positions on display 54. The displayed symbols are evaluated based on the win entitlement and a pay table. Any resulting awards are made to the player.

Persons skilled in the art will appreciate that there may be some additional game play that can result from the selection of symbols, for example, a feature game which involves some additional element of game play which usually only occurs when a trigger condition is met. Types of feature games include: those where a series of free game events are awarded such as free games or re-spins (where some reels are held while others are re-spun); games where the symbols on the reel are changed; and "second screen" games where game play is totally different to the base game, for example where the player makes selections in a "pick a box type" game.

Persons skilled in the art will appreciate that there may be more than one game round in a play of a gaming machine such as is the case when a series of free spins is awarded. (A game round involves at least one of the reels being "spun"—e.g. new symbols of the reels are selected for display at the display positions and the reel is either physically or virtually spun to a stop.) The outcome of a game round may be no win, a win (for example from a winning combination of symbols), a contribution towards a win accrued over a plurality of game rounds, a trigger condition occurring etc. Typically, a win will result in some form of award being made such as an award of credits. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Figure 6:
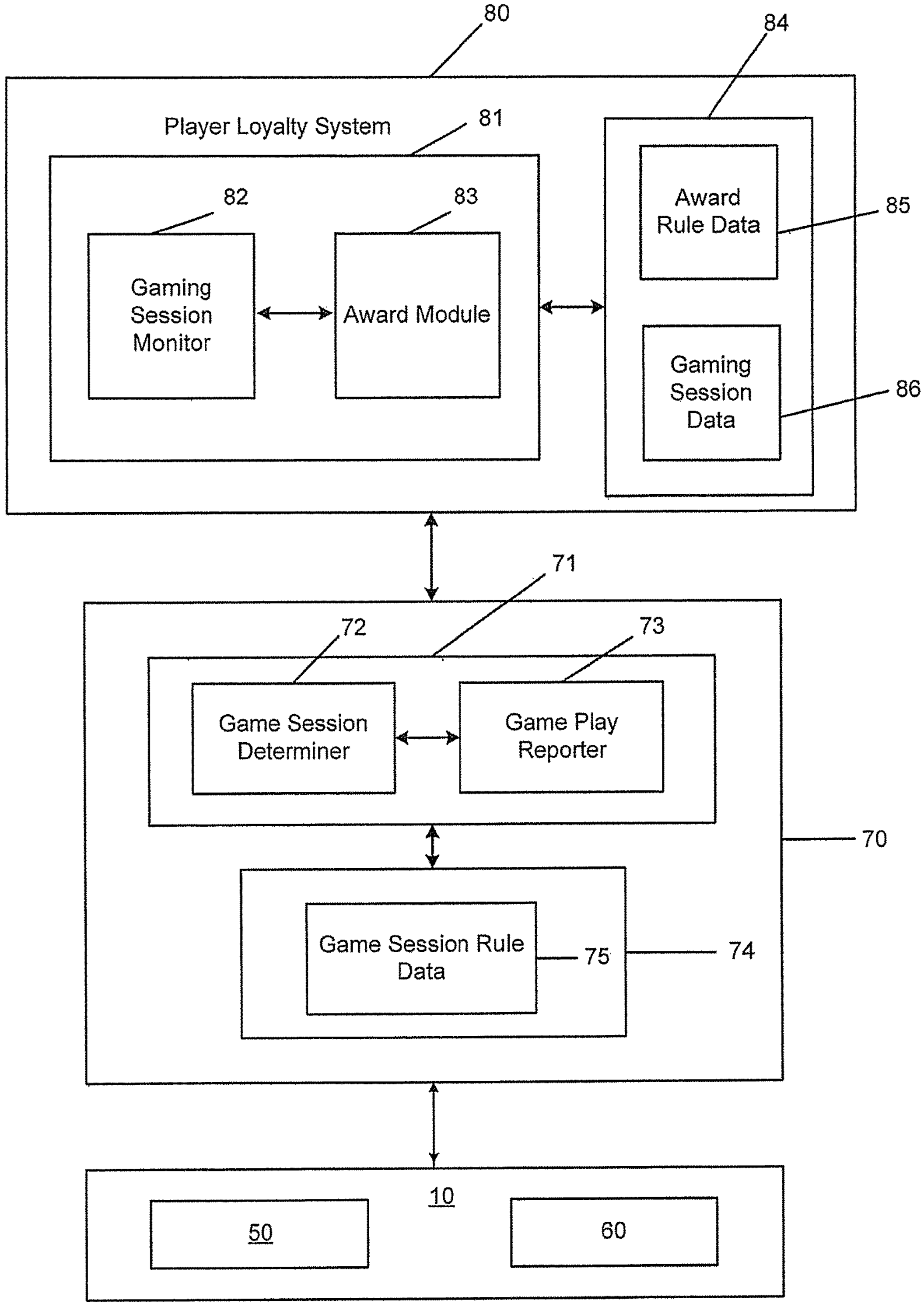
FIG. 6 is a further block diagram of a gaming system.

Referring to FIG. 6, the gaming system 90 is arranged to make additional unidentified players within the gaming system to provide additional awards to those players of a similar type to those normally provided by a player loyalty system but related to a specific gaming session conducted by the unidentified player. That is, the award is additional to any awards stemming from the player placing a wager with the gaming machine as described above. In this respect, the player marketing module 70, monitors the gaming machine 10 to determine a characteristic to play on the gaming machine. In this respect, a player marketing module 70 can be connected to the gaming machine so that it can determine what credits have been put directly to the gaming machine, what credits have been awarded as a result of game play and whether a player has pressed a cash out button to end a gaming session. In this respect, while not shown, a player marketing module 70 may incorporate a ticket reader and a ticket printer in order to enable ticket out/ticket in functionality. For example, where a player can input a ticket having a certain credit amount on it established either through play of another gaming machine or by a cashier receiving currency and generating a ticket. This allows credit to be transferred to the gaming machine 10. Similarly, at the end of a gaming session, the player marketing module 70 can intercept the cash out signal, and output a ticket with a credit value.

FIG. 6 shows the additional functionality within the player marketing module 70 in order to track a gaming session. In this respect, the player marketing module 70 comprises a processor 71 which executes program codes stored within memory 74 including gaming session rule data 75 that prescribes how it is possible to identify the beginning of a gaming session and also what aspects of a gaming session should be reported to the player loyalty system 80. In this respect, gaming session determiner 72 establishes that a new gaming session has been initiated when a new credit input is made to the system that does not identify the player. For example, by insertion of currency into the gaming machine or a ticket as described above. In the embodiment, the game session determiner 72 will only decide that a new session has been initiated if a gaming machine has been idle for a defined time with a zero credit balance. That is, a player is able to continue a gaming session having reached a zero credit balance by placing additional credit in the machine within a defined period of time. The game player reporter 73 reports aspects of game play. In this embodiment, the game play reporter 73 reports turnover data indicating the amount of credit wagered by the player during the gaming session. Game session determiner 72 is arranged to report when a game session ends in response to a cash out signal or upon a gaming machine reaching a zero balance for defined time period (the defined period may be brief to prevent a player from leaving the gaming machine). In some embodiments it may end the game session immediately upon a zero balance being reached. Game play data reported by the game player reporter 73 is received by a gaming session monitor 82 implemented by a processor 81 of the player loyalty system 80. The gaming session monitor monitors the gaming session and updates gaming session data 86 specific to the gaming machine 10, When the gaming session ends, the gaming session monitor advises an awards module 83 which applies award rule data 85 to the gaming session data 86 based on rules specified within the award rule data 85 by the operator of the player loyalty system. Award module 83 then advises the player marketing module 70 which then provides the award to the player. The award may be provided, for example by printing a ticket as an award with a credit amount, a voucher or complimentary slip that can be redeemed at the venue.

Persons skilled in the art will appreciate that as well as credit turnover, other factors could be used to provide an additional award in respect of the gaming session such as the number of games played by the player, the length of the gaming session etc.

Figure 7:
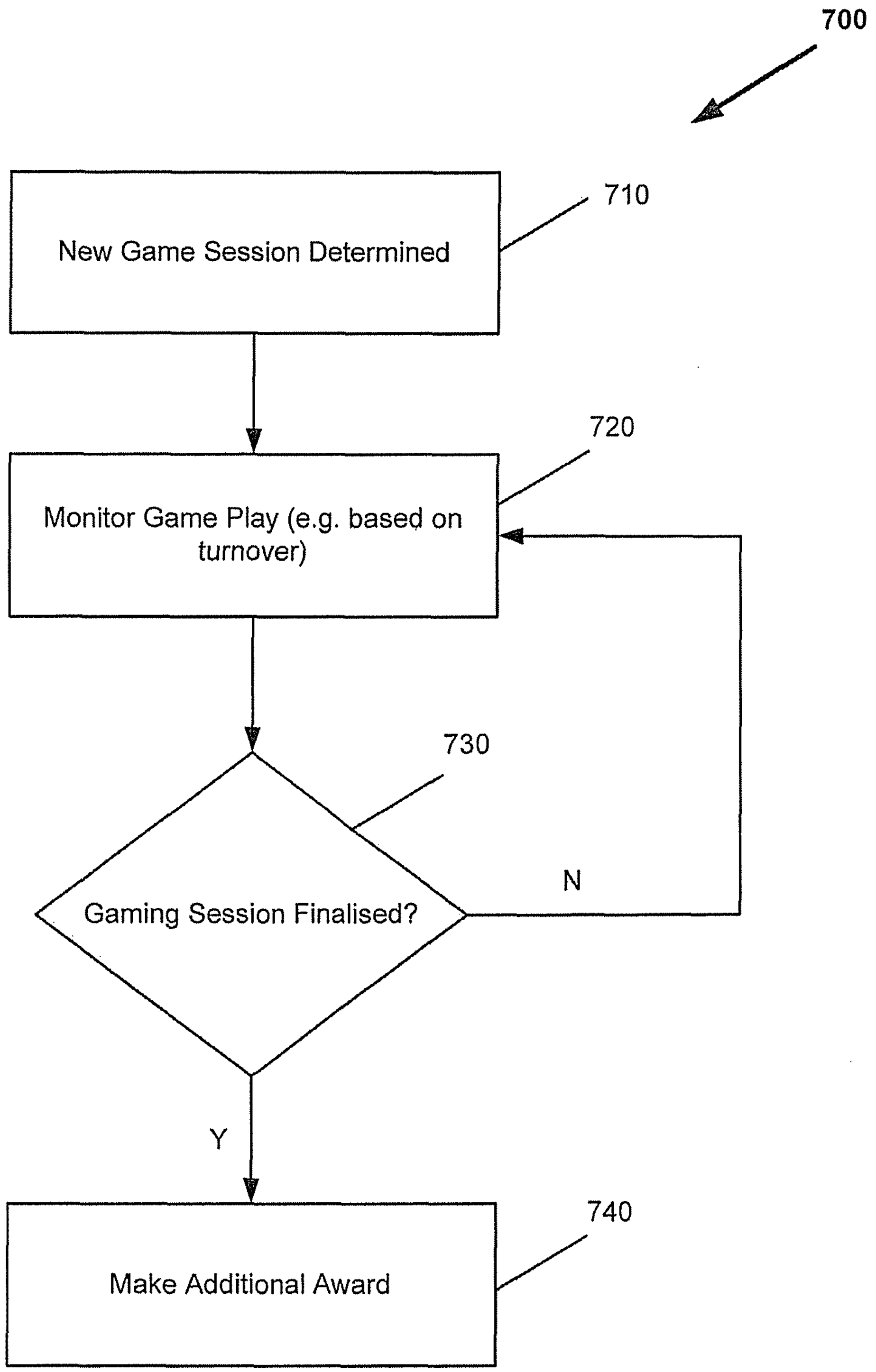
FIG. 7 is a flow chart of an embodiment.

FIG. 7 shows a method 700 of an embodiment of the invention. Once a new gaming session is determined 710, the method proceeds by monitoring 720 the game play (for example, based on turnover). Monitoring 720 continues provided a gaming session is not finished 730. When a gaming session is finishes, an award is made if the player is entitled to an award. That is, for example, if there is sufficient turnover or length of the gaming session to justify an award being made to the player.

Persons skilled in the art will appreciate the method can be implemented in other manners. For example, it will be appreciated in the above that the various components of the player marketing module 70 and player loyalty system provide a game play monitor and that the game play monitor could be provided elsewhere in the gaming system. For example, award rules could be downloaded periodically to the player tracking module so that it could do the gaming session monitoring itself rather than relying on the player loyalty system 80. Further, the game play monitor could be implemented within the gaming device itself. These and other variations will be apparent to persons skilled in the art.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic method of providing an additional player reward at an end of a gaming session played on a gaming machine comprising:

at least one display device displaying the gaming session, at least one processor and memory device configured to operate the gaming machine, an acceptor and cashout device, wherein an associated credit input mechanism configured to receive a physical item via the acceptor representing a monetary value to enable a player to input credits for establishing a credit balance, hardware meters configured to monitor the credit input having been provided by the credit input mechanism for establishing a credit balance, the credit balance being increasable and decreasable, and an output mechanism configured to cause a payout via the cashout device associated with the credit balance, the method comprising:

determining via a game controller in communication with the gaming machine whether the gaming session has been initiated with the established credit balance by an unidentified player at the gaming machine in response to operation of the credit input mechanism associated with the gaming machine and without receiving any information identifying the unidentified player;

monitoring via the game controller play of the gaming machine by the unidentified player in order to determine, independently of any awards made as outcomes of wagers of gaming credits placed by the unidentified player via a game play mechanism of the gaming machine and deducted from the credit balance at the hardware meters, whether one or more characteristics of play of the gaming machine entitle the unidentified player to the additional player reward;

determining via the game controller that the unidentified player has completed the gaming session; and making via the game controller and the output mechanism any determined additional player reward to the unidentified player after the game controller determines that the unidentified player has completed the gaming session, wherein the any determined additional player reward provided via the output mechanism is one or more of a physical reward or a reward embodied on a physical media.

2. The method as claimed in claim 1, wherein the one or more characteristics of play of the game include one or more of a total amount wagered during the gaming session or a number of games played during the gaming session.

3. The method as claimed in claim 1, wherein monitoring play of the gaming machine comprises updating a current total value associated with at least one of the characteristics in response to the unidentified player playing the gaming machine.

4. The method as claimed in claim 3, comprising determining a value of the additional reward based on the current total value.

5. The method as claimed in claim 1, wherein the game controller determines that the unidentified player has completed the gaming session if one or more of:

the game controller of the gaming machine receives a cash out signal, the established credit balance reaches zero and after a predetermined period of time, or the established credit balance reaches zero.

6. A gaming machine comprising:

a display for displaying game outcomes to an unidentified player of the gaming machine comprising: at least one processor and memory device configured to operate the gaming machine, an acceptor and cashout device, wherein;

a credit input mechanism operable by the unidentified player to accept a credit input without inputting any information identifying the unidentified player is configured to receive a physical item via the acceptor representing a monetary value to enable the unidentified player to input credits for establishing a credit balance;

hardware meters configured to monitor the credit input having been provided by the credit input mechanism for establishing a credit balance of gaming credits, the credit balance being increasable and decreasable;

a game play mechanism operable by the unidentified player to place wagers of gaming credits on play of one or more games, the wagers of gaming credits deducted from the credit balance at the hardware meters;

a game controller configured to conduct game play of the one or more games, responsive to the unidentified player having established the credit balance with the game play mechanism, to thereby determine whether to make any awards as outcomes of wagers of gaming credits placed by the unidentified player in respect of the one or more games;

a game play monitor communicatively coupled with the gaming machine, the game play monitor configured to:

determine that a gaming session has been initiated by the unidentified player in response to an initial establishment of gaming credits with the credit input mechanism, monitor game play to determine, independently of any awards made as outcomes of wagers of gaming credits placed by the unidentified player, whether one or more characteristics of play of the gaming machine entitle the unidentified player to an additional award, and determine that the unidentified player has completed the gaming session; and an output mechanism configured to cause a payout via the cashout device associated with any determined additional award to the unidentified player after the game play monitor determines that the unidentified player has completed the gaming session, wherein the any determined additional player award provided via the output mechanism is one or more of a physical award or an award embodied on a physical media.

7. The gaming machine as claimed in claim 6, wherein the one or more characteristics of play of the game include one or more of a total amount wagered during the gaming session or a number of games played during the gaming session.

8. The gaming machine as claimed in claim 6, wherein the game play monitor monitors game play by updating a current total value associated with at least one of the characteristics of play in response to the unidentified player playing the one or more games.

9. The gaming machine as claimed in claim 8, wherein the game play monitor determines a value of the additional award based on the current total value.

10. The gaming machine as claimed in claim 6, wherein the game play monitor is configured to determine that the unidentified player has completed the gaming session if one or more of:

the game controller of the gaming machine receives a cash out signal, the established credit balance reaches zero and after a predetermined period of time, or the established credit balance reaches zero.

* * * * *